Nov. 24, 1936.   C. L. GILSTRAP ET AL   2,061,763
HYDRAULIC BRAKE
Filed Nov. 20, 1934   3 Sheets-Sheet 1
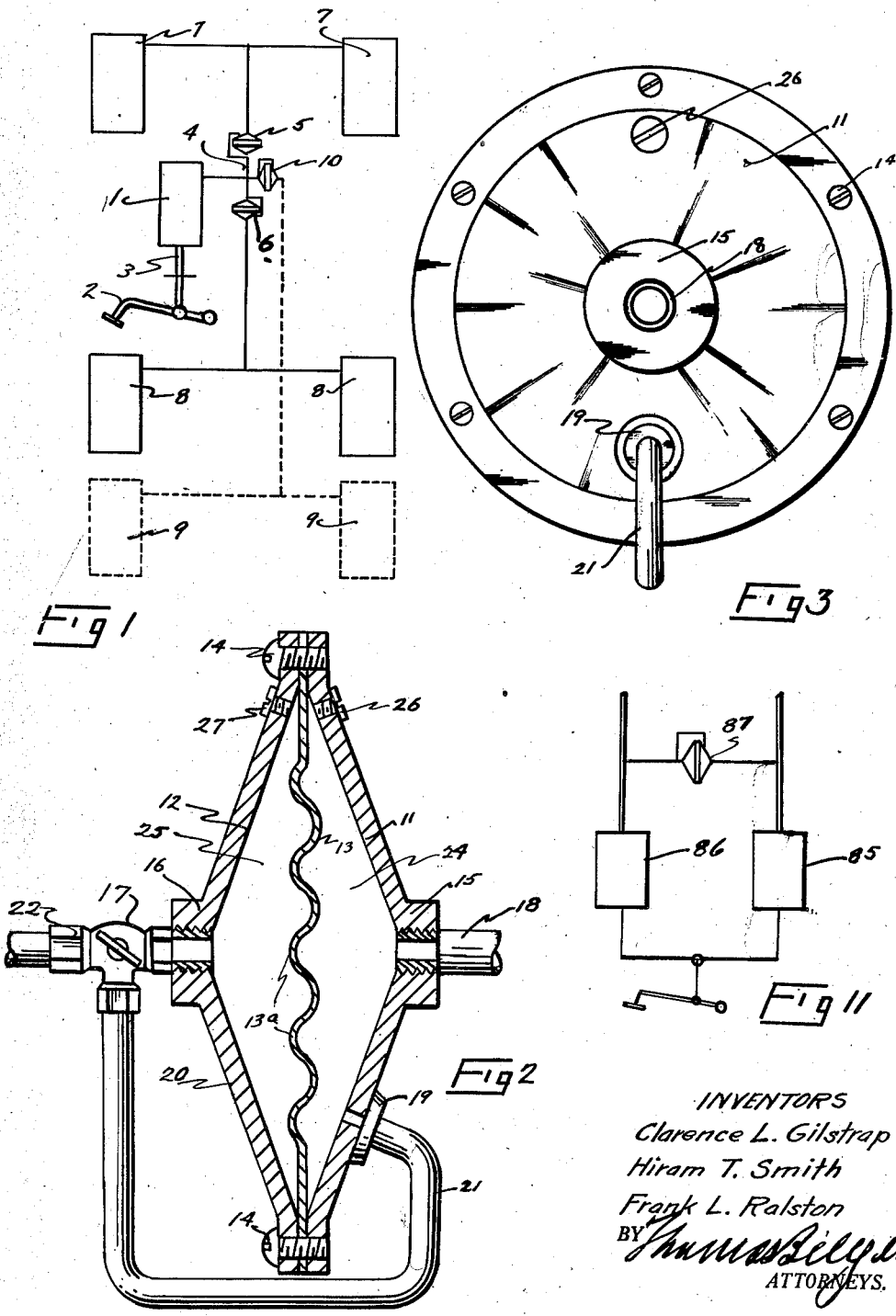
INVENTORS
Clarence L. Gilstrap
Hiram T. Smith
Frank L. Ralston
BY Thomas Bilby
ATTORNEYS.

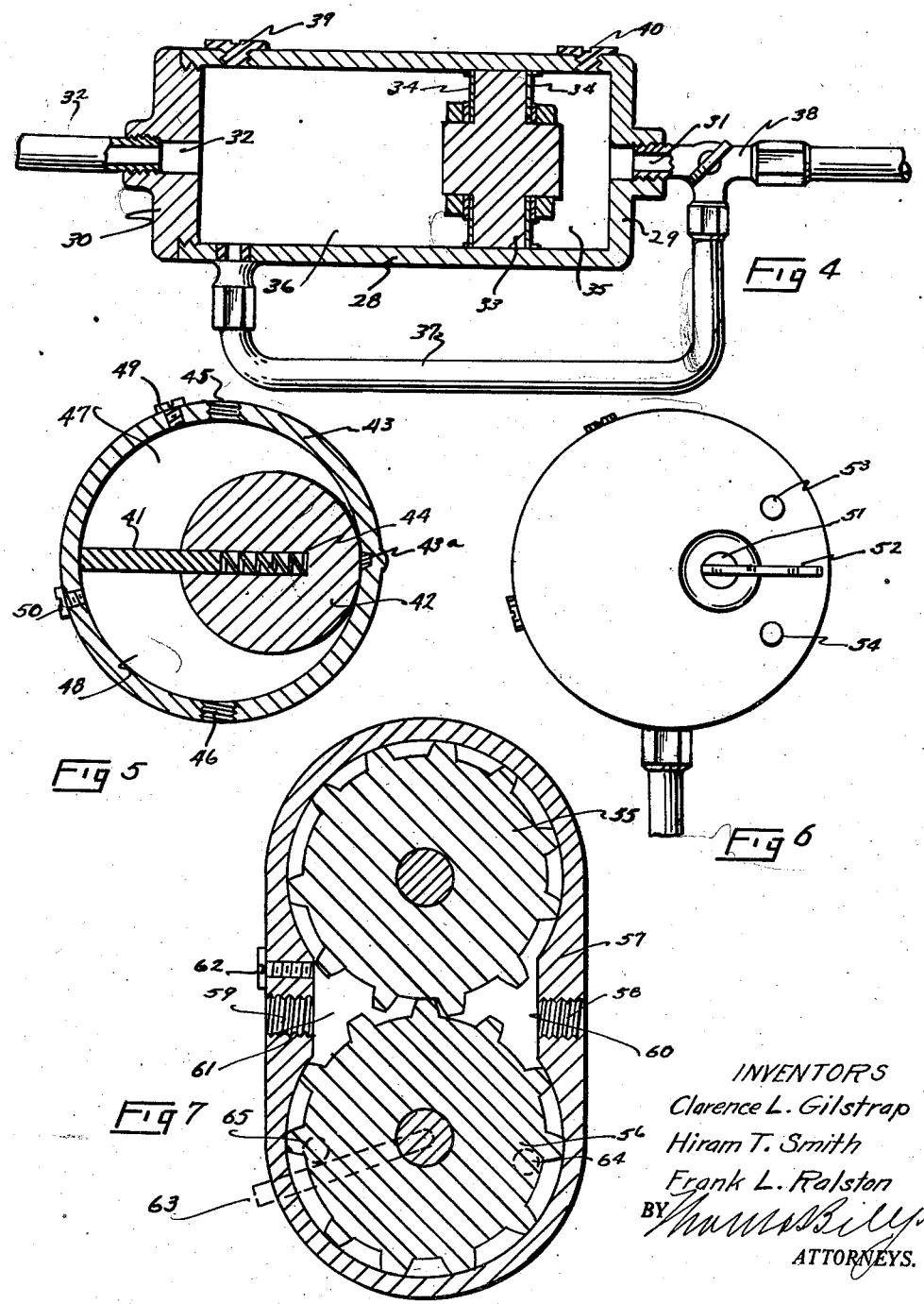

Nov. 24, 1936.   C. L. GILSTRAP ET AL   2,061,763
HYDRAULIC BRAKE
Filed Nov. 20, 1934   3 Sheets-Sheet 3
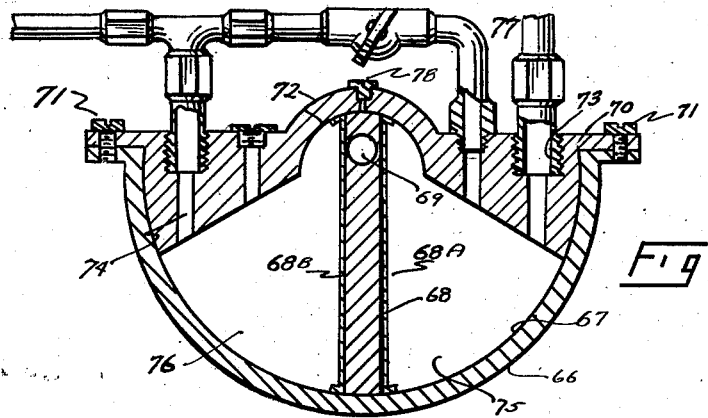
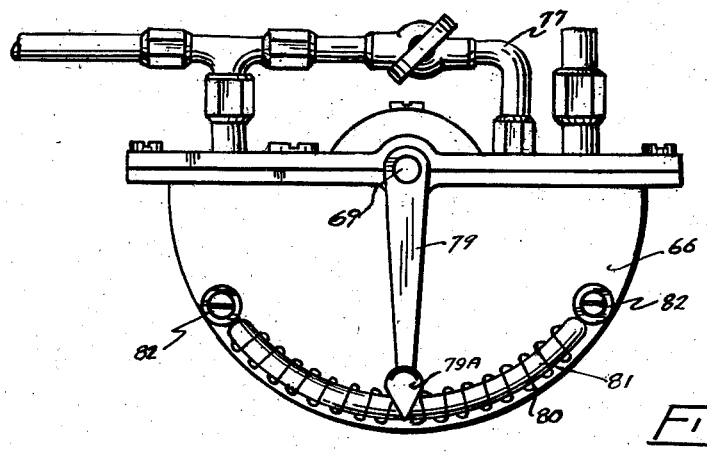
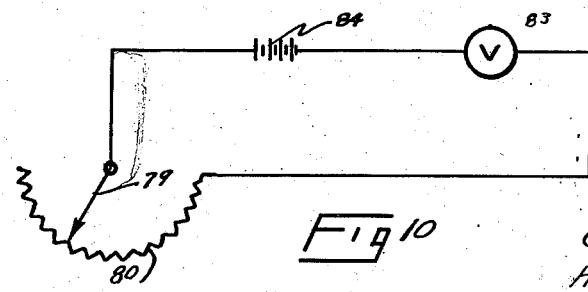
INVENTORS
Clarence L. Gilstrap
Hiram T. Smith
Frank L. Ralston
BY
ATTORNEYS.

Patented Nov. 24, 1936

2,061,763

UNITED STATES PATENT OFFICE 2,061,763

HYDRAULIC BRAKE

Clarence L. Gilstrap, Hiram T. Smith, and Frank L. Ralston, La Grande, Oreg.

Application November 20, 1934, Serial No. 753,886

3 Claims. (Cl. 303—84)

Our invention relates to hydraulic brakes for vehicles and particularly for automobiles and has for its primary object the provision of means whereby a rupture in any of the hydraulic lines will be unable to render the entire hydraulic braking system inoperative as is now the case.

As now constructed the conventional arrangement comprises the master hydraulic cylinder, the piston of which may be actuated by a foot pedal under the control of the operator of the vehicle with which the hydraulic brakes are associated, and a plurality of brake actuating hydraulic cylinders disposed one at each of the brakes of the vehicle and adapted to cause the brakes to act upon the application of pressure to the master hydraulic cylinder. Suitable hydraulic conduits are disposed between the master hydraulic cylinder and each of the brake cylinders. Upon breakage or rupture of any of these conduits the hydraulic pressure throughout the entire system is lost, and usually a considerable quantity of the hydraulic fluid is wasted.

Broadly, we provide means or a plurality of means within the hydraulic lines whereby adjacent portions of the hydraulic fluid are mutually isolated, while yet maintaining mechanical contact. We do this by means which do not interfere with the efficiency of the hydraulic system and which do not deleteriously affect the braking action.

The primary object of our invention is to provide means for decreasing the hazard incident to the rupture of the fluid line in hydraulic brake systems.

Another object of our invention is to provide means whereby, in case of damage to any of the hydraulic lines in a hydraulic braking system, repairs may be effected most expeditiously and without undue loss of the hydraulic fluid.

A still further object of our invention is to provide means whereby the relative condition of the hydraulic systems associated with the different axles of the vehicle may be indicated and observed.

A still further object of our invention provides means whereby in any hydraulic line wherein the hydraulic column does not flow but reciprocates through a comparatively short amplitude, the hydraulic column may be divided into mutually isolated portions whereby a rupture in the hydraulic line would result in the loss of only that portion of the hydraulic column contiguous to the ruptured line.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a diagrammatical layout of a hydraulic braking system embodying an approved form of our new and improved devices.

Fig. 2 is a cross sectional elevation of a unit of our new and improved device.

Fig. 3 is a plan view of the mechanism disclosed in Fig. 2.

Fig. 4 is a cross sectional elevation of a modified form of our invention. In this modification we employ a piston as disclosed.

Fig. 5 is a cross sectional elevation of another modification of our device. In this modification we employ an eccentric member embodying a sliding vane.

Fig. 6 is an elevation of the mechanism disclosed in Fig. 5.

Fig. 7 is a still further modification of our invention, embodying a plurality of gears mounted in a closely embracing housing.

Fig. 8 is a sectional elevation of a still further modification of our invention, employing a pivoted vane.

Fig. 9 is an elevation of the mechanism disclosed in Fig. 8.

Fig. 10 is a schematic diagram of the electrical indicating mechanism which may be used with certain modifications of our invention.

Fig. 11 is a diagrammatical layout of an adaptation of our device in conjunction with a pair of master hydraulic cylinders actuated from a common pedal.

Like reference characters refer to like parts throughout the several views.

The approved embodiment of our new and improved device is installed in conjunction with a hydraulic master cylinder 1, the piston of which is actuated by suitable means as a foot pedal 2 connected thereto by piston rod 3. A T 4 is provided upon the outlet of the master cylinder 1 and two of my devices 5 and 6 are mounted one at each end of the run of the T 4. One of these devices, as 5, isolates the hydraulic column controlling brakes 7 mounted upon one end of the vehicle as the front end. The other of these devices 6, isolates the hydraulic column controlling brakes 8 mounted upon the rear end of the vehicle. For those installations employing more than two pairs of wheels, brakes for the extra wheels, as at 9, are controlled by the master cylinder via an additional one of my devices 10 suitably mounted in relation to devices 5 and 6.

We preferably form our device from a pair of similar dished body elements 11 and 12 with their concave surfaces toward each other. An impervious flexible diaphragm 13 is placed between and held by the plane edges of the body elements. This diaphragm may be provided with concentric convolutions 13A to permit maximum flexure. Suitable fastening means as screws 14 are disposed through the body elements securing them and the diaphragm held therebetween tightly together. The body members 11 and 12 are provided with centrally located bosses 15 and 16, respectively, through which suitably threaded holes are disposed permitting the mounting of a three way valve 17 and a pipe fitting 18. The pipe fitting 18 is in open communication with a conduit leading to the vehicle brakes. The three way valve has one of its ports, the inlet, in open communication with the master cylinder 1 of the vehicle, while the remaining two outlet ports are adapted for alternative open communication with the first. For normal operation of the braking system the inlet port of the valve is in open communication with that outlet port which is attached to the boss 16. A boss 19 is disposed upon the body member 11 and is preferably placed below the horizontal center line of our device. This boss is provided with a threaded aperture. A conduit 21 is disposed at one of its ends within the threaded aperture of boss 19 as by being screwed thereinto and at its other end is fastened in open communication with the remaining outlet port of the valve 17. When the three way valve 17 is in normal position, chamber 25, lying between the diaphragm 13 and body element 12, is in open communication with the master cylinder 1, and when the valve 17 is in its alternative position chamber 24 lying between the diaphragm 13 and body element 11 is in open communication with the master cylinder 1. Vent plugs 26 and 27 are suitably disposed in the respective body elements 11 and 12 at points corresponding with the tops of chambers 24 and 25. The chamber 24 is in open communication with the line leading to the hydraulic brake cylinders via the pipe fitting 18. Assuming the hydraulic braking system to be in operating condition with the conduits filled with suitable hydraulic fluid and with the valve 17 in normal position, any pressure exerted upon the foot pedal 2 will be transferred to all of the brake actuating hydraulic cylinders. Hydraulic pressure from the master cylinder 1 is transmitted via connection 4 to the chamber 25 of my device with which it is in open communication. The hydraulic pressure exerted against the flexible diaphragm 13 is transmitted to the hydraulic fluid in the chamber 24 and thence to the brake actuating hydraulic cylinders with which chamber 24 is in open communication. The interposition of diaphragm 13 between that portion of the hydraulic column lying within the chamber 24 and that portion lying within the chamber 25 allows a virtually undiminished transfer of the unit hydraulic pressure from one side of the diaphragm to the other.

Should a rupture occur in the hydraulic conduit between the chamber 24 and the brake actuating hydraulic cylinders, only that part of the hydraulic fluid would be lost which lies beyond the diaphragm 13; the portion between the master hydraulic cylinder and the diaphragm 13 being effectually isolated by virtue of our device. Repairs having been effected upon such a ruptured conduit, the mechanism may be restored to its original condition as follows:

Vent plug 26 is removed permitting free access of chamber 24 to the atmosphere. Valve 17 is placed in its alternative position, placing chamber 24 in open communication with the master cylinder 1, which is then actuated causing a flow of hydraulic fluid into that portion of the hydraulic column lying below the diaphragm 13. The usual precautions necessary in refilling the brake actuating hydraulic cylinders are of course to be observed. When sufficient hydraulic fluid has been placed within the repaired conduit and within the chamber 24 the fluid level will reach the vent from which the vent plug 26 has been removed thus purging the air from the chamber 24 and eliminating the possibility of an air pocket. The valve 17 is then placed in normal position and the vent plug 26 is replaced. Additional fluid, to replace that which was lost by reason of the rupture, is added to that within the hydraulic master cylinder 1 in the usual manner.

Should the hydraulic conduit be ruptured at a point between the master hydraulic cylinder and my device only that portion of the hydraulic column contained therein would be lost, the portion lying beyond the diaphragm 13 remaining intact. To replace the lost fluid after repair of the ruptured line in this case the vent plug 27 would be removed and the hydraulic master cylinder 1 and the chamber 25 and the intervening conduit filled with hydraulic fluid after which the vent plug 27 would be replaced. Of course where a plurality of our devices is installed in the hydraulic line, in case of a rupture between the hydraulic cylinder and any of our devices this last named procedure would of necessity be effected concurrently upon each of the devices.

Our device may of course be mounted so closely to the master cylinder as to become virtually integral therewith, to reduce the possibilities of a rupture therebetween. It will be readily apparent that in case of a rupture in the conduit supplying either the front wheel brakes or the rear wheel brakes of a vehicle, only those brakes will be incapacitated, the other brakes remaining in unimpaired working order.

While we find that a diaphragm disposed between adjacent chambers affords an extremely satisfactory means for isolating adjacent portions of the hydraulic column we do not wish to be confined to this type of mechanism, several other types being adaptable to our purpose. We briefly enumerate some such modifications. Fig. 4 discloses a modification of our device wherein we employ cylinder 28 having an integral head 29 and a removable head 30 suitably mounted at the opposite end as by being threadedly attached thereto. Threaded openings 31 and 32 extend one through each of the cylinder heads 29 and 30 respectively. These openings are adapted for engagement, one with a three way valve 38 and the other with the hydraulic conduit connecting with the brakes. A floating piston 33 is disposed within the cylinder 28 and is adapted to effect a hydraulic seal between adjacent portions of the cylinder of the device as by cup leathers 34. The cylinder 28 is thus effectively divided into mutually isolated chambers 35 and 36. A conduit 37 controlled by the three way valve 38 provides means whereby the master hydraulic cylinder 1 may be optionally placed in open communication with either of the chambers 35 or 36. A pair of vent plugs 40 and 39 are provided whereby air pockets may be prevented when placing hydraulic fluid within chambers 35 and 36 respectively. The operation of this modification of my device is analogous to that of my first disclosed device.

In Figs. 5 and 6 we disclose another modification of our mechanism wherein is provided a sliding vane 41, carried by a rotatable member 42 eccentrically mounted within a circular housing 43. A reactance element as a spring 44 is disposed within the rotatable member 42 and reacts against the sliding vane 41 to maintain a tight working relationship with the interior wall of the circular housing 43. Suitable packing means, as felt strip 43A, may be disposed in a suitable recess in housing 43 and adapted to bear against member 42. Threaded inlet and outlet ports 45 and 46 are provided communicating respectively with chambers 47 and 48. A three way valve controlled by-pass, not here shown, provides elective open communication between the master hydraulic cylinder 1 and either of the chambers 47 or 48. Vent plugs 49 and 50 are provided for venting the air chambers 47 and 48 respectively when filling these with hydraulic fluid. In this modification of my device an extension 51 of the rotatable member 42 protrudes through an end of the circular housing 43. A lever 52 is attached to the extension 51. Limiting stops 53 and 54 are provided and are so placed in relation to the lever 52 that they restrict the sweep of the vane 41 to an arc of less than a semi-circle, preventing its displacement beyond those points which would place chambers 47 and 48 in mutual communication.

Fig. 7 discloses a further embodiment of our invention wherein we employ a gear pump principle to provide flexible isolating means between the adjacent chambers of our mechanism. A pair of coacting gears 55 and 56 is rotatably mounted within housing 57. Hydraulic conduit attachment ports 58 and 59 are provided upon opposite sides of the housing 57 and are in open communication with chambers 60 and 61 into which the housing is divided by the gears 55 and 56. A vent plug 62 is suitably located in the housing 57 to permit the escape of trapped air when filling the housing with hydraulic fluid. An arm 63 is provided upon an extension of one of the gears and oscillates in unison therewith. A pair of removable stops 64 and 65 is provided whereby the range of oscillation of the arm 63, and consequently of the gear to which it is attached, may be held within predetermined limits. With the type of mechanism disclosed in Fig. 7 no valve controlled by-pass is required, the transfer of the hydraulic fluid as from chamber 60 to chamber 61 being accomplished by the rotation of the gears 55 and 56 by means of the lever 63 which may be rotated upon removal of the stops 64 and 65. It is of course essential that the stops 64 and 65 be replaced upon completion of the fluid transfer as above outlined.

A still further embodiment of our invention is disclosed in Figs. 8 and 9. In this embodiment we provide a housing 66 provided with an arcuate surface 67 with which a vane 68 coacts. The vane 68 is fixedly mounted upon a shaft 69, the axial center line of which coincides with the center about which the arcuate surface 67 is generated. A cover plate 70 is fitted to the housing 66 and is held thereupon by suitable fastening means as by screws 71. The cover plate 70 has an arcuate surface 72 described about a center co-axial with that of the arcuate surface 67. The radius of the arcuate surface 72 is however materially less than the radius of the arcuate surface 67. That end of the vane 68 which is remote from the end which contacts the arcuate surface 67 is adapted to coact closely with the arcuate surface 72. Suitable sealing means, as cup leathers 68A and 68B, may be mounted upon the vane 68. Hydraulic conduit attachment ports 73 and 74 are provided within the cover 70 and are so arranged as to be in open communication respectively with chambers 75 and 76. A valve control by-pass 77 is provided whereby chambers 75 and 76 may be selectively placed in open communication one with the other. A vent plug 78 is disposed within the cover 70 at a point midway the arc of the arcuate surface 72. The vent, so disposed, may be placed in communication with either chamber 75 or 76 by oscillation of the vane 68 which provides means for placing the vent in open communication with either of these chambers. An external arm 79 mounted upon the shaft 69 and in alignment with the vane 68 may be utilized to manually adjust the position of the vane 68 in servicing operations upon the device. Should this modification of our device be used with the three-way valve as disclosed in the previous modifications the arm 79 would not be required. Should it be desired to have an indicating means placed at a point remote from my device to show the relative position of the vane 68, and the relative volume of the chambers 75 and 76, the arm 79 may be provided with a contact 79A. A resistance wire 80 wound upon a suitable dielectric core 81 and fastened to the housing 66 by any suitable means, as by installed screws 82, is adapted to coact with the contact 79A on the arm 79 to form a variable resistance in an electric circuit incorporating an ohm-meter 83 and a source of electric energy as a battery 84. The ohm-meter 83 may be placed in any suitable position as upon the instrument panel where it may be readily observed by the operator of the vehicle upon which our device is mounted. Where a plurality of our devices is installed on a vehicle, such an ohm-meter will be required for each. With such an installation, a rupture in any of the hydraulic circuits will be indicated by a marked variation in the electric resistance indicated by the ohm-meters.

In Fig. 11 we show a modified adaptation of our device wherein it is installed as a common link between two master cylinders actuated from a common pedal. In this adaptation, master cylinders 85 and 86 are each in communication with a corresponding end of one of our devices 87. Hydraulic conduits continuing from the junctions of the respective master cylinder outlets with our device are continued one to the front brakes and one to the rear brakes of the vehicle. This construction provides means whereby two master cylinders may be utilized one for each end of the vehicle, with the hydrostatic pressure developed by both maintained at an equal value. In this type of construction a separate master cylinder may be provided for each end of the vehicle, and the resultant brake action will be uniform, due to the equalization of pressure within the two hydraulic systems.

While the form of mechanism herein shown and described, is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In combination with a hydraulic braking system, a body element having a chamber disposed therewithin and located within the hydraulic circuit of the braking system, means yieldingly separating the chamber into two parts, means for optionally establishing open communication between the two parts of the chamber, and means for independently venting the two parts of the chamber and means for independently filling each of the chambers one at a time.

2. In combination with a hydraulic braking system, having a pair of master cylinders, a body element having a chamber disposed therewithin and located in a hydraulic circuit common to the two cylinders, means yieldingly separating the chamber into two parts, means for optionally establishing open communication between the two parts of the chamber, means for venting the two parts of the chamber one at a time and manually manipulative means for positioning the separating means.

3. In combination with a hydraulic braking system, having a master hydraulic cylinder, a body element having a chamber therewithin disposed and located within the hydraulic circuit of the braking system, means yieldingly separating the chamber into two parts, means for optionally establishing open communication between the master hydraulic cylinder and either of the two parts of the chamber, means for venting the two parts of the chamber independently and means for refilling each of the chambers with the operating hydraulic fluid, and settable means for repositioning the separating means.

CLARENCE L. GILSTRAP.
HIRAM T. SMITH.
FRANK L. RALSTON.